United States Patent
Yang et al.

(10) Patent No.: US 11,777,309 B2
(45) Date of Patent: Oct. 3, 2023

(54) ENERGY STORAGE SYSTEM AND SELF-START METHOD THEREOF

(71) Applicant: CONTEMPORARY AMPEREX TECHNOLOGY CO., LIMITED, Ningde (CN)

(72) Inventors: Xiaowei Yang, Ningde (CN); Ruirui You, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 534 days.

(21) Appl. No.: 17/129,609

(22) Filed: Dec. 21, 2020

(65) Prior Publication Data
US 2021/0111558 A1    Apr. 15, 2021

Related U.S. Application Data

(63) Continuation of application No. PCT/CN2020/073248, filed on Jan. 20, 2020.

(30) Foreign Application Priority Data

Jan. 24, 2019   (CN) .......................... 201910069315.4

(51) Int. Cl.
*H02J 1/10*    (2006.01)
*H02J 7/00*    (2006.01)
*H02J 3/38*    (2006.01)

(52) U.S. Cl.
CPC .............. *H02J 1/102* (2013.01); *H02J 3/381* (2013.01); *H02J 7/0025* (2020.01); *H02J 7/00308* (2020.01)

(58) Field of Classification Search
USPC ........................................................ 320/134
See application file for complete search history.

(56) References Cited

U.S. PATENT DOCUMENTS

2011/0174561 A1* 7/2011 Bowman ............. B60L 15/2009
                                                    180/65.245
2012/0146410 A1    6/2012 Shih
(Continued)

FOREIGN PATENT DOCUMENTS

CN    102280879 A    12/2011
CN    103516045 A    1/2014
(Continued)

OTHER PUBLICATIONS

Ningder Age New Energy Technology Co. Ltd., First Office Action, CN201910069315.4, dated Mar. 31, 2021, 5 pgs.
(Continued)

*Primary Examiner* — Mohammed Alam
(74) *Attorney, Agent, or Firm* — Kilpatrick Townsend & Stockton LLP

(57) ABSTRACT

Embodiments of the present application provide an energy storage system and a self-start method thereof. The system includes a power conversion system; a DC bus; n single racks, where n is a natural number, and n is greater than or equal to 1; a host computer, connected to each of the n single racks; and a master battery management unit, connected to each of the n single racks, where each of the n single racks includes a first miniature circuit breaker, a DC/DC power module, a slave battery management unit, a wake-up relay, a main positive high voltage relay, a main negative high voltage relay, a CSC module, and a battery box. The technical solutions provided in the embodiments of the present application can resolve the problem that an energy storage system cannot self-start when there is no external power supply.

10 Claims, 2 Drawing Sheets

(56) References Cited

U.S. PATENT DOCUMENTS

| | | | | |
|---|---|---|---|---|
| 2016/0109916 A1* | 4/2016 | Li | ............................ | H02J 7/35 |
| | | | | 700/295 |
| 2016/0176305 A1* | 6/2016 | James | ....................... | H02J 3/38 |
| | | | | 307/26 |
| 2021/0111558 A1* | 4/2021 | Yang | ................... | H02J 7/00308 |

FOREIGN PATENT DOCUMENTS

| | | | |
|---|---|---|---|
| CN | 103683467 | A | 3/2014 |
| CN | 104682431 | A | 2/2015 |
| CN | 104967214 | A | 10/2015 |
| CN | 106300329 | A | 1/2017 |
| CN | 107749632 | A | 10/2017 |
| CN | 206759309 | U | 12/2017 |
| CN | 108683202 | A | 10/2018 |
| CN | 108695870 | A | 10/2018 |
| KR | 20150081987 | A | 7/2015 |
| KR | 20150138900 | A | 12/2015 |
| WO | WO-2020151665 | A1 * | 7/2020 .............. H02J 1/102 |

OTHER PUBLICATIONS

Contemporary Amperex Technology Co., Limited, Extended European Search Report, EP20745042.0, dated Jul. 10, 2021, 9 pgs.
Contemporary Amperex Technology Co., Limited, International Search Report and Written Opinion, PCT/CN2020/073248, dated Apr. 22, 2020, 12 pgs.

* cited by examiner

ENERGY STORAGE SYSTEM AND SELF-START METHOD THEREOF

CROSS REFERENCE TO RELATED APPLICATIONS

This application is a continuation application of PCT Patent Application No. PCT/CN2020/073248, entitled "POWER STORAGE SYSTEM AND SELF-STARTING METHOD THEREFOR" filed on Jan. 20, 2020, which claims priority to Chinese Patent Application No. 201910069315.4, filed with the State Intellectual Property Office of the People's Republic of China on Jan. 24, 2019, and entitled "ENERGY STORAGE SYSTEM AND SELF-START METHOD THEREOF", all of which are incorporated herein by reference in their entirety.

TECHNICAL FIELD

The present application relates to the field of energy storage technologies, and in particular, to an energy storage system and a self-start method thereof.

BACKGROUND

In a joint energy storage application scenario, energy of an energy storage system comes from solar and wind energy, and after being converted into electric energy by an energy conversion device, is supplied to a grid for use or stored in an energy storage system for storage.

At present, in a design of an energy storage system, if energy input from solar and wind energy cannot meet power consumption of the system itself, the energy storage system cannot be started, resulting in that externally available power held by the energy storage system cannot be normally output.

SUMMARY

In view of this, embodiments of the present application provide an energy storage system and a self-start method thereof, to resolve a prior-art problem that an energy storage system cannot self-start when there is no external power supply.

According to an aspect, an embodiment of the present application provides an energy storage system. The system includes a power conversion system; a DC bus; n single racks, where n is a natural number, and n is greater than or equal to 1; a host computer, connected to each of the n single racks; and a master battery management unit, connected to each of the n single racks. Each of the n single racks includes a first miniature circuit breaker, a DC/DC power module, a slave battery management unit, a wake-up relay, a main positive high voltage relay, a main negative high voltage relay, a cell supervision circuit (CSC) module, and a battery box, where the first miniature circuit breaker is connected to both the DC/DC power module and the battery box, the wake-up relay is connected to each of the DC/DC power module, the slave battery management unit, and the CSC module, the DC/DC power module is connected to each of the first miniature circuit breaker, the wake-up relay, and the slave battery management unit, the main positive high voltage relay is connected to the battery box, and the main negative high voltage relay is connected to the battery box.

Further, each of the n single racks further includes a release; and a release relay, connected to each of the slave battery management unit, the DC/DC power module, and the release.

Further, each of the n single racks further includes a second miniature circuit breaker, one end of which is connected to the power conversion system, and the other end of which is connected to the DC/DC power module.

Further, the system further includes a main isolation switch, one end of which is connected to the power conversion system, and the other end of which is connected to each of the n single racks.

Further, each of the n single racks further includes a circuit breaker, one end of which is connected to the power conversion system, and the other end of which is connected to an isolation switch, one end of which is connected to the circuit breaker, and the other end of which is connected to both the main positive high voltage relay and the main negative high voltage relay.

Further, each of the n single racks further includes a high voltage precharge relay and a precharge resistor, where the high voltage precharge relay is connected in series with the precharge resistor, and then the high voltage precharge relay and the precharge resistor in series connection are connected in parallel with the main positive high voltage relay.

Further, each of the n single racks further includes a fuse, one end of which is connected to the main positive high voltage relay, and the other end of which is connected to the battery box.

According to an aspect, an embodiment of the present application provides a self-start method of an energy storage system. The method includes: closing a first miniature circuit breaker of a target single rack, so that a DC/DC power module of the target single rack is energized and outputs power to a master battery management unit, a host computer, and a slave battery management unit of the target single rack, where the target single rack is a single rack, meeting a preset condition, of the energy storage system; controlling, by the slave battery management unit of the target single rack, a wake-up relay of the target single rack to be closed, so that a CSC module of the target single rack starts to work after being awakened, thereby completing start-up of the target single rack; controlling, through the host computer, the target single rack to be powered on at high voltage, a DC bus to be energized, and a power conversion system to be energized; receiving, by a DC/DC power module of a $k^{th}$ single rack, power from the DC bus, and outputting the power to a slave battery management unit of the $k^{th}$ single rack, where k is a natural number between 1 and n, and the $k^{th}$ single rack is any single rack of the energy storage system except for the target single rack; and controlling, by the slave battery management unit of the $k^{th}$ single rack, a wake-up relay of the $k^{th}$ single rack to be closed, so that a CSC module of the $k^{th}$ single rack starts to work after being awakened, thereby completing start-up of the $k^{th}$ single rack.

Further, the method further includes: performing, by the slave battery management unit of the target single rack, detection on a switching status of the first miniature circuit breaker of the target single rack; if it is detected that the first miniature circuit breaker of the target single rack is not opened, controlling, by the slave battery management unit of the target single rack after preset time, a release relay of the target single rack to be closed; and performing, by a release of the target single rack after the release is energized, an action of opening the first miniature circuit breaker of the target single rack.

Further, the method further includes: when an $x^{th}$ single rack triggers over-discharge protection, controlling, by a slave battery management unit of the $x^{th}$ single rack, a main positive high voltage relay of the $x^{th}$ single rack and a main negative high voltage relay of the $x^{th}$ single rack to be opened first, and then a wake-up relay of the $x^{th}$ single rack to be opened, where the $x^{th}$ single rack is any single rack of the energy storage system.

In this embodiment of the present application, when the power conversion system has no power input, the target single rack, meeting the preset condition, of the energy storage system is determined, and the first miniature circuit breaker of the target single rack is closed. The DC/DC power module of the target single rack receives power from a battery group and outputs the power to the master battery management unit, the host computer, and the slave battery management unit of the target single rack. The slave battery management unit of the target single rack controls the wake-up relay of the target single rack to be closed, so that the CSC module of the target single rack starts to work after being awakened, thereby completing start-up of the target single rack. Through the host computer, the target single rack is controlled to be powered on at high voltage, the DC bus is controlled to be energized, and the PCS is controlled to be energized. The PCS controls other single racks to complete high voltage power-on. This resolves the prior-art problem that an energy storage system cannot self-start when there is no external power supply, and implements that the energy storage system self-starts without an external power supply.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To better understand the technical solutions of the present application, the embodiments of the present application are detailed below with reference to the accompanying drawings.

It should be noted that the described embodiments are merely some but not all of the embodiments of the present application. All other embodiments obtained by a person of ordinary skill in the art based on the embodiments of the present application without creative efforts shall fall within the protection scope of the present application.

The terms used in the embodiments of the present application are merely for the purpose of illustrating specific embodiments, and are not intended to limit the present application. The terms "a", "the" and "this" of singular forms used in the embodiments and the appended claims of the present application are also intended to include plural forms, unless otherwise specified in the context clearly.

It should be understood that in this specification, a term "and/or" is only an associative relationship for describing associated objects, indicating that three relationships may exist. For example, A and/or B may indicate three situations: A exists independently; A and B exist simultaneously; and B exists independently. In addition, a character "/" in this specification generally indicates an "or" relationship between contextually associated objects.

PCS: Power Conversion System;

PV: Photovoltaic, photovoltaic;

MBMU: Master Battery Management Unit, master battery management unit;

SBMU: Slave Battery Management Unit, slave battery management unit;

DC/DC: DC conversion module, configured to convert high voltage direct current into low voltage direct current in the embodiments of the present application, for example, converting about 400-volt direct current into 24-volt direct current; and CSC: Cell Supervision Circuit.

Figure 1:
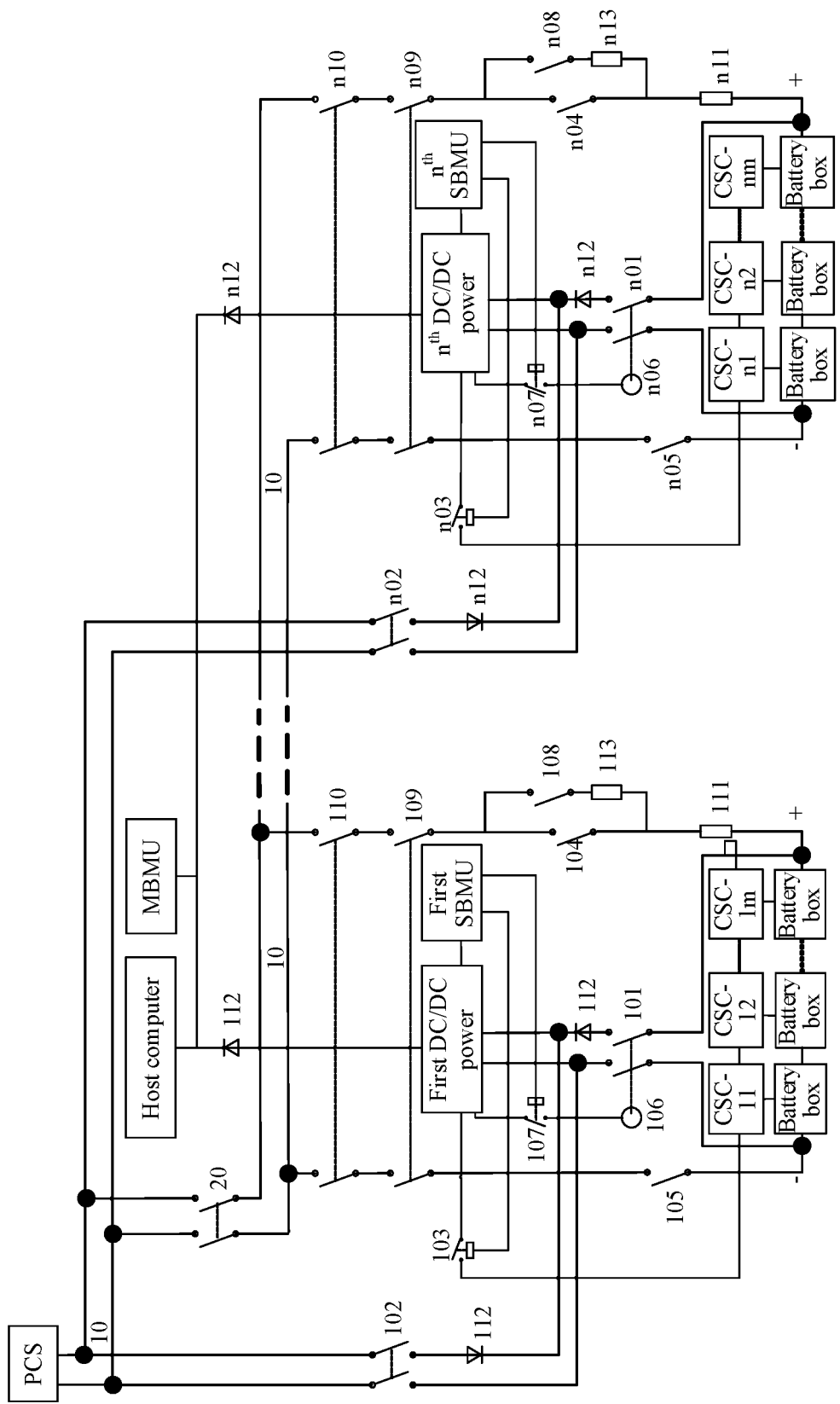
FIG. 1 is a schematic diagram of an optional energy storage system according to an embodiment of the present application.

FIG. 1 is a schematic diagram of an optional energy storage system according to an embodiment of the present application. The energy storage system includes n single racks. Due to a size of the figure, FIG. 1 shows the first single rack and the $n^{th}$ single rack, components of other n–2 single racks and a connection relationship between the components are similar to those of the first single rack and the $n^{th}$ single rack.

Denotations of numbers in FIG. 1 are as follows:

10: DC bus;
20: main isolation switch;
101: first miniature circuit breaker of the first single rack;
102: second miniature circuit breaker of the first single rack;
103: wake-up relay of the first single rack;
104: main positive high voltage relay of the first single rack;
105: main negative high voltage relay of the first single rack;
106: release of the first single rack;
107: release relay of the first single rack;
108: high voltage precharge relay of the first single rack;
109: isolation switch of the first single rack;
110: circuit breaker of the first single rack;
111: fuse of the first single rack;
112: diode of the first single rack;
113: precharge resistor of the first single rack;
n01: first miniature circuit breaker of the $n^{th}$ single rack;
n02: second miniature circuit breaker of the $n^{th}$ single rack;
n03: wake-up relay of the $n^{th}$ single rack;
n04: main positive high voltage relay of the $n^{th}$ single rack;
n05: main negative high voltage relay of the $n^{th}$ single rack;
n06: release of the $n^{th}$ single rack;
n07: release relay of the $n^{th}$ single rack;
n08: high voltage precharge relay of the $n^{th}$ single rack;
n09: isolation switch of the $n^{th}$ single rack;
n10: circuit breaker of the $n^{th}$ single rack;
n11: fuse of the $n^{th}$ single rack;
n12: diode of the $n^{th}$ single rack; and
n13: precharge resistor of the $n^{th}$ single rack.

It should be noted that the power conversion system PCS in the embodiments of the present application may be based on photovoltaic PV, wind energy, or the like. This is not limited herein. A host computer may be an industrial computer, a touchscreen, a PC, or the like.

As shown in FIG. 1, the energy storage system includes a power conversion system, a DC bus, n single racks, a host computer, and a master battery management unit. n is a natural number, and n is greater than or equal to 1.

The host computer is connected to each of the n single racks.

The master battery management unit is connected to each of the n single racks.

Each of the n single racks includes a first miniature circuit breaker, a DC/DC power module, a slave battery management unit, a wake-up relay, a main positive high voltage relay, a main negative high voltage relay, a CSC module, and a battery box, where the first miniature circuit breaker is connected to both the DC/DC power module and the battery box, the wake-up relay is connected to each of the DC/DC power module, the slave battery management unit, and the CSC module, the DC/DC power module is connected to each of the first miniature circuit breaker, the wake-up relay, and the slave battery management unit, the main positive high voltage relay is connected to the battery box, and the main negative high voltage relay is connected to the battery box.

When the power conversion system PCS has no power input, a single rack, meeting a preset condition, of the energy storage system is determined first. For example, the preset condition may be voltage being highest, or voltage being greater than specified voltage. It is assumed that the single rack, meeting the preset condition, of the energy storage system is a single rack b, a first miniature circuit breaker of the single rack b is closed, and a DC/DC power module of the single rack b receives power from a battery group (the battery group is located in a battery box), and outputs the power to the master battery management unit, the host computer, and a slave battery management unit of the single rack b.

The slave battery management unit of the single rack b controls a wake-up relay of the single rack b to be closed, so that CSC-b1 to CSC-bm modules (a CSC module of the single rack b) start to work after being awakened, thereby completing start-up of the single rack b.

Through the host computer, the single rack b is controlled to be powered on at high voltage (that is, a main positive high voltage relay of the single rack b and a main negative high voltage relay of the single rack b are closed), the DC bus is controlled to be energized, and the PCS is controlled to be energized.

For other single racks, the $k^{th}$ single rack is used as an example. A DC/DC power module of the $k^{th}$ single rack receives power from the DC bus and outputs the power to a slave battery management unit of the $k^{th}$ single rack.

The slave battery management unit of the $k^{th}$ single rack controls a wake-up relay of the $k^{th}$ single rack to be closed, so that CSC-k1 to CSC-km modules (a CSC module of the $k^{th}$ single rack) start to work after being awakened, thereby completing start-up of the $k^{th}$ single rack.

The PCS controls the $k^{th}$ single rack to complete high voltage power-on (that is, a main positive high voltage relay of the $k^{th}$ single rack and a main negative high voltage relay of the $k^{th}$ single rack are closed).

After high voltage power-on, a system operator manually opens the first miniature circuit breaker of the single rack b. At this point, the energy storage system completes self-start and is powered by a battery.

In this embodiment of the present application, when the power conversion system has no power input, the target single rack, meeting the preset condition, of the energy storage system is determined, and the first miniature circuit breaker of the target single rack is closed. The DC/DC power module of the target single rack receives power from a battery group and outputs the power to the master battery management unit, the host computer, and the slave battery management unit of the target single rack. The slave battery management unit of the target single rack controls the wake-up relay of the target single rack to be closed, so that the CSC module of the target single rack starts to work after being awakened, thereby completing start-up of the target single rack. Through the host computer, the target single rack is controlled to be powered on at high voltage, the DC bus is controlled to be energized, and the PCS is controlled to be energized. The PCS controls other single racks to complete high voltage power-on. This resolves the prior-art problem that an energy storage system cannot self-start when there is no external power supply, and implements that the energy storage system self-starts without an external power supply.

In some embodiments, each of the n single racks further includes a release and a release relay. The release relay is connected to each of the slave battery management unit, the DC/DC power module, and the release.

Functions of the release and the release relay are to open the first miniature circuit breaker of the single rack.

The PCS controls the single racks to complete high voltage power-on in sequence. After high voltage power-on is successfully completed, the system operator needs to manually open the first miniature circuit breaker of the single rack b. At this point, the energy storage system completes self-start and is powered by a battery.

When the system operator forgets to manually open the first miniature circuit breaker of the single rack b, the slave battery management unit of the single rack b continuously performs detection on a switching status of the first miniature circuit breaker of the single rack b. If it is detected that the first miniature circuit breaker of the single rack b is not opened, after a period of time (the time may be set based on a specific application scenario), the slave battery management unit of the single rack b controls a release relay of the single rack b to be closed. After being energized, a release of the single rack b performs an action of opening the first miniature circuit breaker of the single rack b. If the first miniature circuit breaker of the single rack b is still in a closed state after the release action, alarm information is sent to instruct the system operator to perform troubleshooting.

In some embodiments, each of the n single racks further includes a second miniature circuit breaker. One end of the second miniature circuit breaker is connected to the power conversion system, and the other end of the second miniature circuit breaker is connected to the DC/DC power module.

In some embodiments, the system further includes a main isolation switch. One end of the main isolation switch is connected to the power conversion system, and the other end of the main isolation switch is connected to each of the n single racks.

In some embodiments, each of the n single racks further includes a circuit breaker and an isolation switch. One end of the circuit breaker is connected to the main isolation switch, and the other end of the circuit breaker is connected to the isolation switch. One end of the isolation switch is connected to the circuit breaker, and the other end of the isolation switch is connected to both the main positive high voltage relay and the main negative high voltage relay.

The isolation switch has four poles. A first pole is connected to the main positive high voltage relay, a second pole is connected to a first pole of the circuit breaker, a third pole is connected to the main negative high voltage relay, and a fourth pole is connected to a third pole of the circuit breaker.

The circuit breaker has four poles. The first pole is connected to the second pole of the isolation switch, a second pole is connected to a fourth pole of the main isolation switch, the third pole is connected to the fourth pole of the isolation switch, and a fourth pole is connected to a third pole of the main isolation switch.

The first miniature circuit breaker has four poles. A first pole is connected to a positive electrode of the battery box, a second pole is connected to a diode, a third pole is connected to a negative electrode of the battery box, and a fourth pole is connected to the DC/DC power module. The fourth pole is further connected to a third pole of the second miniature circuit breaker.

The second miniature circuit breaker has four poles. A first pole is connected to a diode, the third pole is connected to the fourth pole of the first miniature circuit breaker, and one of a second pole and a fourth pole is connected to a positive electrode of the PCS, and the other one is connected to a negative electrode of the PCS. In addition, the second pole is connected to a second pole of the main isolation switch, and the fourth pole is connected to a first pole of the main isolation switch. It should be noted that the diode connected to the second pole of the first miniature circuit breaker is not a same diode as the diode connected to the first pole of the second miniature circuit breaker.

The main isolation switch has four poles. The first pole is connected to each of fourth poles of second miniature circuit breakers of the n single racks, the second pole is connected to each of second poles of the second miniature circuit breakers of the n single racks, the third pole is connected to each of fourth poles of circuit breakers of the n single racks, and the fourth pole is connected to each of second poles of the circuit breakers of the n single racks. In addition, one of the first pole and the second pole is connected to the positive electrode of the PCS, and the other one is connected to the negative electrode of the PCS.

In some embodiments, each of the n single racks further includes a high voltage precharge relay and a precharge resistor. The high voltage precharge relay is connected in series with the precharge resistor, and then the high voltage precharge relay and the precharge resistor in series connection are connected in parallel with the main positive high voltage relay.

In some embodiments, each of the n single racks further includes a fuse. One end of the fuse is connected to the main positive high voltage relay, and the other end of the fuse is connected to the battery box.

In a process of controlling high voltage power-on of the single rack, first the main negative high voltage relay is closed, then the high voltage precharge relay is closed, and then the main positive high voltage relay is closed, and finally the high voltage precharge relay is opened. An advantage of doing so is to prevent other components of the single rack from being damaged by excessive current in the process of high voltage power-on.

For example, in a process of controlling high voltage power-on of a single rack k, first a main negative high voltage relay of the single rack k is closed, then a high voltage precharge relay of the single rack k is closed, and then a main positive high voltage relay of the single rack k is closed, and finally the high voltage precharge relay of the single rack k is opened.

When a single rack x triggers over-discharge protection, a slave battery management unit of the single rack x first controls a main positive high voltage relay and a main negative high voltage relay of the single rack x to be opened, and then controls a wake-up relay of the single rack x to be opened. CSC-x1 to CSC-xm (a CSC module of the single rack x) stop working after a wake-up signal disappears, so that the single rack x exits a system, but other single racks and the system work normally, thereby implementing protection for the single rack.

Figure 2:
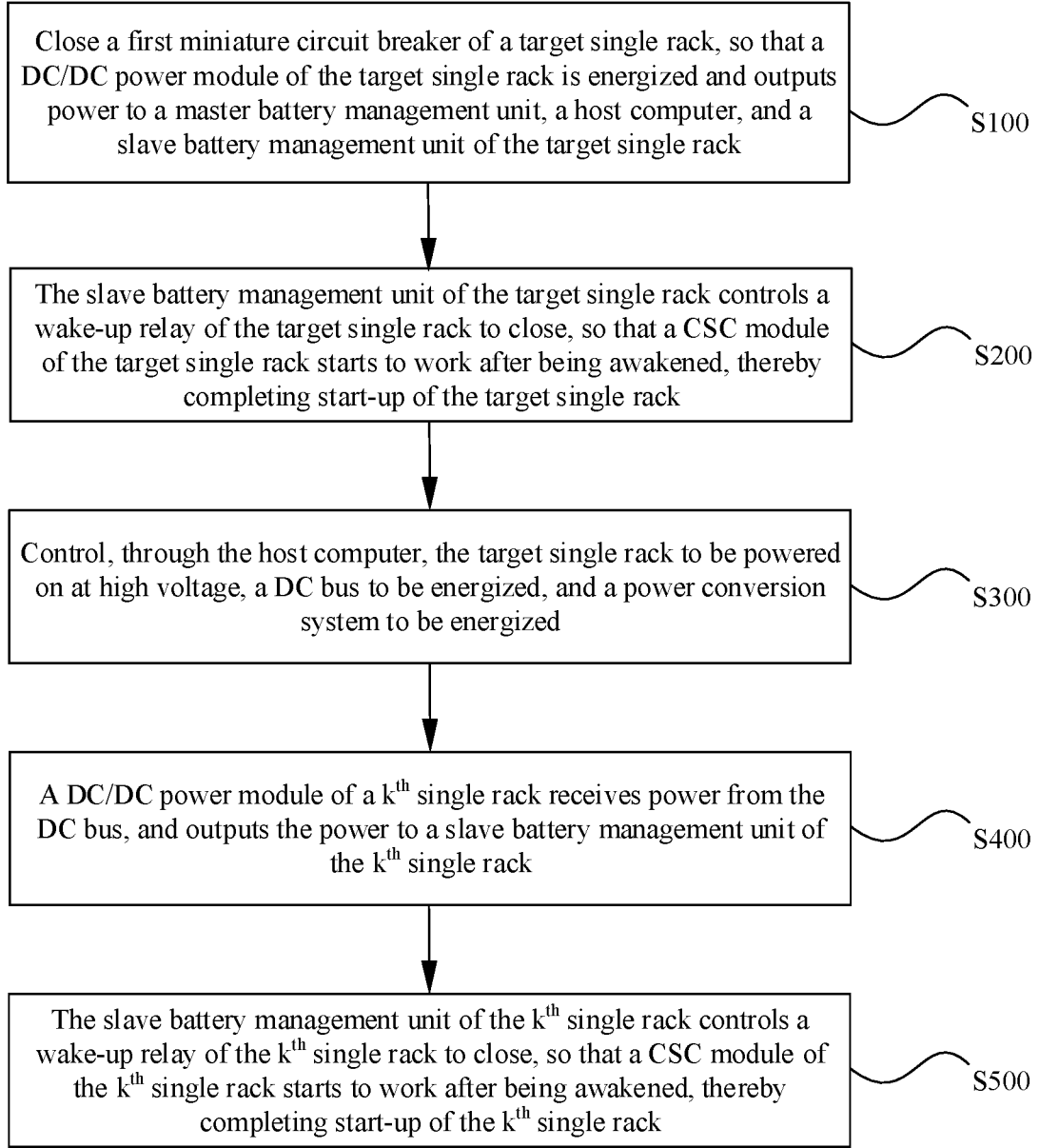
FIG. 2 is a flowchart of an optional self-start method of an energy storage system according to an embodiment of the present application.

FIG. 2 is a flowchart of an optional self-start method of an energy storage system according to an embodiment of the present application. This method is applied to the foregoing energy storage system. As shown in FIG. 2, the method includes the following steps.

Step S100. Close a first miniature circuit breaker of a target single rack, so that a DC/DC power module of the target single rack is energized and outputs power to a master battery management unit, a host computer, and a slave battery management unit of the target single rack, where the target single rack is a single rack, meeting a preset condition, of the energy storage system.

Step S200. The slave battery management unit of the target single rack controls a wake-up relay of the target single rack to be closed, so that a CSC module of the target single rack starts to work after being awakened, thereby completing start-up of the target single rack.

Step S300. Control, through the host computer, the target single rack to be powered on at high voltage, a DC bus to be energized, and a power conversion system to be energized.

Step S400. A DC/DC power module of a $k^{th}$ single rack receives power from the DC bus, and outputs the power to a slave battery management unit of the $k^{th}$ single rack, where k is a natural number between 1 and n, and the $k^{th}$ single rack is any single rack of the energy storage system except for the target single rack.

Step S500. The slave battery management unit of the $k^{th}$ single rack controls a wake-up relay of the $k^{th}$ single rack to be closed, so that a CSC module of the $k^{th}$ single rack starts to work after being awakened, thereby completing start-up of the $k^{th}$ single rack.

Before the energy storage system is started, a main isolation switch, n circuit breakers (110 to n10 in FIG. 1), n isolation switches (109 to n09 in FIG. 1), and n second miniature circuit breakers of the energy storage system (102 to n02 in FIG. 1) are all closed.

The following describes a self-start process of the energy storage system in two scenarios.

Scenario 1: The Power Conversion System PCS has Power Input.

A single rack 1 is used as an example to describe a start-up process of a single rack. A DC/DC power module of the single rack 1 receives power from the PCS, and outputs the power to the master battery management unit, the host computer, and a slave battery management unit of the single rack 1. The slave battery management unit of the single rack 1 controls a wake-up relay of the single rack 1 to be closed, so that CSC-11 to CSC-bm modules (a CSC module of the single rack 1) start to work after being awakened, thereby completing start-up of the single rack 1. Other single racks complete start-up following a same process. After being started, the energy storage system is powered by the power conversion system PCS.

Scenario 2: The Power Conversion System PCS has No Power Input.

A single rack, meeting a preset condition, of the energy storage system is determined first. For example, the preset condition may be voltage being highest, or voltage being greater than specified voltage. It is assumed that the single rack, meeting the preset condition, of the energy storage system is a single rack b, a first miniature circuit breaker of the single rack b is closed, and a DC/DC power module of the single rack b receives power from a battery group (the battery group is located in a battery box), and outputs the power to the master battery management unit, the host computer, and a slave battery management unit of the single rack b.

The slave battery management unit of the single rack b controls a wake-up relay of the single rack b to be closed, so that CSC-b1 to CSC-bm modules (a CSC module of the single rack b) start to work after being awakened, thereby completing start-up of the single rack b.

Through the host computer, the single rack b is controlled to be powered on at high voltage (that is, a main positive high voltage relay of the single rack b and a main negative high voltage relay of the single rack b are closed), the DC bus is controlled to be energized, and the PCS is controlled to be energized.

For other single racks, the $k^{th}$ single rack is used as an example. A DC/DC power module of the $k^{th}$ single rack receives power from the DC bus and outputs the power to a slave battery management unit of the $k^{th}$ single rack.

The slave battery management unit of the $k^{th}$ single rack controls a wake-up relay of the $k^{th}$ single rack to be closed, so that CSC-kl to CSC-km modules (a CSC module of the $k^{th}$ single rack) start to work after being awakened, thereby completing start-up of the $k^{th}$ single rack.

The PCS controls the $k^{th}$ single rack to complete high voltage power-on (that is, a main positive high voltage relay of the $k^{th}$ single rack and a main negative high voltage relay of the $k^{th}$ single rack are closed).

After high voltage power-on, a system operator manually opens the first miniature circuit breaker of the single rack b. At this point, the energy storage system completes self-start and is powered by a battery.

In this embodiment of the present application, when the power conversion system has no power input, the target single rack, meeting the preset condition, of the energy storage system is determined, and the first miniature circuit breaker of the target single rack is closed. The DC/DC power module of the target single rack receives power from a battery group and outputs the power to the master battery management unit, the host computer, and the slave battery management unit of the target single rack. The slave battery management unit of the target single rack controls the wake-up relay of the target single rack to be closed, so that the CSC module of the target single rack starts to work after being awakened, thereby completing start-up of the target single rack. Through the host computer, the target single rack is controlled to be powered on at high voltage, the DC bus is controlled to be energized, and the PCS is controlled to be energized. The PCS controls other single racks to complete high voltage power-on. This resolves the prior-art problem that an energy storage system cannot self-start when there is no external power supply, and implements that the energy storage system self-starts without an external power supply.

In an optional implementation, the self-start method of the energy storage system provided in this embodiment of the present application further includes step S600 in addition to steps S100 to S500.

Step S600. The slave battery management unit of the target single rack performs detection on a switching status of the first miniature circuit breaker of the target single rack; if it is detected that the first miniature circuit breaker of the target single rack is not opened, after preset time, the slave battery management unit of the target single rack controls a release relay of the target single rack to be closed; and after the release is energized, a release of the target single rack performs an action of opening the first miniature circuit breaker of the target single rack.

Functions of the release and the release relay are to open the first miniature circuit breaker of the single rack.

The PCS controls the single racks to complete high voltage power-on in sequence. After high voltage power-on is successfully completed, the system operator needs to manually open the first miniature circuit breaker of the single rack b. At this point, the energy storage system completes self-start and is powered by a battery.

When the system operator forgets to manually open the first miniature circuit breaker of the single rack b, the slave battery management unit of the single rack b continuously performs detection on a switching status of the first miniature circuit breaker of the single rack b. If it is detected that the first miniature circuit breaker of the single rack b is not opened, after a period of time (the time may be set based on a specific application scenario), the slave battery management unit of the single rack b controls a release relay of the single rack b to be closed. After being energized, a release of the single rack b performs an action of opening the first miniature circuit breaker of the single rack b. If the first miniature circuit breaker of the single rack b is still in a closed state after the release action, alarm information is sent to instruct the system operator to perform troubleshooting.

In an optional implementation, the self-start method of the energy storage system provided in this embodiment of the present application further includes step S700 in addition to steps S100 to S600.

Step S700. When an $x^{th}$ single rack triggers over-discharge protection, a slave battery management unit of the $x^{th}$ single rack first controls a main positive high voltage relay of the $x^{th}$ single rack and a main negative high voltage relay of the $x^{th}$ single rack to be opened, and then controls a wake-up relay of the $x^{th}$ single rack to be opened, where the $x^{th}$ single rack is any single rack of the energy storage system.

When a single rack x triggers over-discharge protection, a slave battery management unit of the single rack x first controls a main positive high voltage relay and a main negative high voltage relay of the single rack x to be opened, and then controls a wake-up relay of the single rack x to be opened. CSC-x1 to CSC-xm (a CSC module of the single rack x) stop working after a wake-up signal disappears, so that the single rack x exits a system, but other single racks and the system work normally, thereby implementing protection for the single rack.

In this embodiment of the present application, black start of the energy storage system is implemented (that is, self-start of the energy storage system is completed without an external power supply). If the energy storage system includes a plurality of single racks, a single rack with highest voltage of the energy storage system is properly selected as a power supply source for black start of the energy storage system. This can achieve a specific balance effect.

The foregoing descriptions are merely preferred embodiments of the present application, and are not intended to limit the present application. Any modification, equivalent replacement, or improvement made without departing from the spirit and principle of the present application shall fall within the protection scope of the present application.

What is claimed is:

1. An energy storage system, comprising:
a power conversion system;
a DC bus;
n single racks, wherein n is a natural number, and n is greater than or equal to 1;

a host computer, connected to each of the n single racks; and a master battery management unit, connected to each of the n single racks, wherein each of the n single racks comprises a first miniature circuit breaker, a DC/DC power module, a slave battery management unit, a wake-up relay, a main positive high voltage relay, a main negative high voltage relay, a CSC module, and a battery box, wherein the first miniature circuit breaker is connected to both the DC/DC power module and the battery box, the wake-up relay is connected to each of the DC/DC power module, the slave battery management unit, and the CSC module, the DC/DC power module is connected to each of the first miniature circuit breaker, the wake-up relay, and the slave battery management unit, the main positive high voltage relay is connected to the battery box, and the main negative high voltage relay is connected to the battery box.

2. The system according to claim 1, wherein each of the n single racks further comprises:

a release; and a release relay, connected to each of the slave battery management unit, the DC/DC power module, and the release.

3. The system according to claim 1, wherein each of the n single racks further comprises:

a second miniature circuit breaker, one end of which is connected to the power conversion system, and the other end of which is connected to the DC/DC power module.

4. The system according to claim 1, comprising:

a main isolation switch, one end of which is connected to the power conversion system, and the other end of which is connected to each of the n single racks.

5. The system according to claim 4, wherein each of the n single racks further comprises:

a circuit breaker, one end of which is connected to the main isolation switch, and the other end of which is connected to an isolation switch; and the isolation switch, one end of which is connected to the circuit breaker, and the other end of which is connected to both the main positive high voltage relay and the main negative high voltage relay.

6. The system according to claim 5, wherein each of the n single racks further comprises:

a high voltage precharge relay and a precharge resistor, wherein the high voltage precharge relay is connected in series with the precharge resistor, and then the high voltage precharge relay and the precharge resistor in series connection are connected in parallel with the main positive high voltage relay.

7. The system according to claim 1, wherein each of the n single racks further comprises:

a fuse, one end of which is connected to the main positive high voltage relay, and the other end of which is connected to the battery box.

8. A method of self-starting an energy storage system, comprising:

closing a first miniature circuit breaker of a target single rack, so that a DC/DC power module of the target single rack is energized and outputs power to a master battery management unit, a host computer, and a slave battery management unit of the target single rack, wherein the target single rack is a single rack, meeting a preset condition, of the energy storage system;

controlling, by the slave battery management unit of the target single rack, a wake-up relay of the target single rack to be closed, so that a CSC module of the target single rack starts to work after being awakened, thereby completing start-up of the target single rack;

controlling, through the host computer, the target single rack to be powered on at high voltage, a DC bus to be energized, and a power conversion system to be energized;

receiving, by a DC/DC power module of a $k^{th}$ single rack, power from the DC bus, and outputting the power to a slave battery management unit of the $k^{th}$ single rack, wherein k is a natural number between 1 and n, and the $k^{th}$ single rack is any single rack of the energy storage system except for the target single rack; and controlling, by the slave battery management unit of the $k^{th}$ single rack, a wake-up relay of the $k^{th}$ single rack to be closed, so that a CSC module of the $k^{th}$ single rack starts to work after being awakened, thereby completing start-up of the $k^{th}$ single rack.

9. The method according to claim 8, comprising:

performing, by the slave battery management unit of the target single rack, detection on a switching status of the first miniature circuit breaker of the target single rack; if it is detected that the first miniature circuit breaker of the target single rack is not opened, controlling, by the slave battery management unit of the target single rack after preset time, a release relay of the target single rack to be closed; and performing, by a release of the target single rack after the release is energized, an action of opening the first miniature circuit breaker of the target single rack.

10. The method according to claim 8, comprising:

when an $x^{th}$ single rack triggers over-discharge protection, controlling, by a slave battery management unit of the $x^{th}$ single rack, a main positive high voltage relay of the $x^{th}$ single rack and a main negative high voltage relay of the $x^{th}$ single rack to be opened first, and then a wake-up relay of the $x^{th}$ single rack to be opened, wherein the $x^{th}$ single rack is any single rack of the energy storage system.

* * * * *